United States Patent
Cooley

(10) Patent No.: US 8,973,133 B1
(45) Date of Patent: Mar. 3, 2015

(54) SYSTEMS AND METHODS FOR DETECTING ABNORMAL BEHAVIOR OF NETWORKED DEVICES

(71) Applicant: Symantec Corporation, Mountain View, CA (US)

(72) Inventor: Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 175 days.

(21) Appl. No.: 13/720,843

(22) Filed: Dec. 19, 2012

(51) Int. Cl.
| | | |
|---|---|---|
| *G06F 11/00* | (2006.01) | |
| *G06F 12/14* | (2006.01) | |
| *G06F 12/16* | (2006.01) | |
| *G08B 23/00* | (2006.01) | |
| *G06F 21/50* | (2013.01) | |
| *H04L 29/06* | (2006.01) | |

(52) U.S. Cl.
CPC ............ *G06F 21/50* (2013.01); *H04L 63/1408* (2013.01); *H04L 63/1416* (2013.01)
USPC .......................................................... 726/22

(58) Field of Classification Search
CPC ........................ H04L 63/1408; H04L 63/1416
USPC .......................................................... 726/22
See application file for complete search history.

(56) References Cited

U.S. PATENT DOCUMENTS

2013/0263257 A1* 10/2013 O'Reirdan ...................... 726/22
2014/0165130 A1* 6/2014 Zaitsev ............................. 726/1

OTHER PUBLICATIONS

"Andromaly": a behavioral malware detection framework for android devices Asaf Shabtai • Uri Kanonov • Yuval Elovici • Chanan Glezer • Yael Weiss Publised online Jan. 6, 2011.*
Enhancing Security of Linux-based Android Devices Aubrey-Derrick Schmidt, Hans-Gunther Schmidt, Jan Clausen, Ahmet Camtepe, and Sahin Albayrak Sep. 17, 2008.*
ThreatVision™: Security Event Management System Copyright © 2003 ViewTrust, Inc.*

* cited by examiner

*Primary Examiner* — Kambiz Zand
*Assistant Examiner* — Benjamin Kaplan
(74) *Attorney, Agent, or Firm* — ALG Intellectual Property, LLC

(57) ABSTRACT

A computer-implemented method for detecting abnormal behavior of networked devices may include identifying a purpose-built device expected to have a predictable pattern of behavior on a network, determining a baseline pattern of behavior of the purpose-built device, monitoring the network to detect a behavior of the purpose-built device and comparing the behavior to the baseline pattern of behavior of the purpose-built device in order to determine that the behavior may be an abnormal behavior. Various other methods, systems, and computer-readable media are also disclosed.

20 Claims, 7 Drawing Sheets

SYSTEMS AND METHODS FOR DETECTING ABNORMAL BEHAVIOR OF NETWORKED DEVICES

BACKGROUND

The convenience of a home that responds intelligently to the owner's needs and desires at the click of a button has long been a dream of technology enthusiasts. Every year that dream is coming closer to reality with purpose-built smart devices for the home that communicate over networks with computers and smart phones. Lights turn themselves off when the owner is away, media controllers download entertainment automatically, and all of it may be connected to the home network, and, in some cases, the greater Internet. By engaging in targeted Internet communications, these purpose-built smart devices may automatically download updates, retrieve environmental data, and/or receive remote control communications Unfortunately, any device that is connected to a network may be exposed to malware. This has been seen with desktop computers, smart phones, and even pacemakers. As the number of purpose-built devices on home networks increase, so may the number of standardized malware targets. While traditional security systems such as router firewalls may provide some protection against attacks, once a purpose-built device has been infected with and/or reconfigured by malware, traditional systems may provide limited protection. Accordingly, the instant disclosure identifies and addresses a need for additional and improved systems and methods for detecting abnormal behavior of networked devices.

SUMMARY

As will be described in greater detail below, the instant disclosure generally relates to systems and methods for detecting abnormal behavior of networked devices by determining baseline patterns of behavior (e.g. by querying a server and/or observing the device for a predetermined time period) and monitoring the networked devices for deviations from baseline patterns of behavior. In some examples, observations about the networked devices may be sent to an observation database for use in future behavioral assessments.

In one example, a computer-implemented method for detecting abnormal behavior of networked devices may include (1) identifying a purpose-built device expected to have a predictable pattern of behavior on a network, (2) determining a baseline pattern of behavior of the purpose-built device, (3) monitoring the network to detect a behavior of the purpose-built device and (4) comparing the behavior to the baseline pattern of behavior of the purpose-built device in order to determine that the behavior may be an abnormal behavior.

In some examples the computer-implemented method may further include performing a security action in response to determining that the behavior of the purpose-built device may be abnormal. The security action may include blocking the purpose-built device from the network, filtering out the abnormal behavior of the purpose-built device on the network, and/or alerting a user to the abnormal behavior of the purpose-built device.

In some embodiments, determining the baseline pattern of behavior of the purpose-built device may include monitoring the purpose-built device for a predetermined period of time to establish by observation the baseline behavior of the purpose-built device.

In some embodiments, determining the baseline pattern of behavior of the purpose-built device may include determining a type of the purpose-built device and querying an observation database populated with at least one observation of baseline behavior of at least one of a plurality of purpose-built devices of the type. In some examples, the type may indicate a make and model of the purpose-built device.

In some embodiments, determining the baseline pattern of behavior of the purpose-built device may include querying an observation database with at least one behavioral observation about the purpose-built device and receiving a response correlating the behavioral observation about the purpose-built device with the baseline pattern of behavior of the purpose-built device.

In some embodiments, the computer-implemented method may include sending a behavioral observation about the purpose-built device and/or an identifier of the purpose-built device to an observation database.

In some examples, the computer-implemented method may include receiving information about an update to the purpose-built device and determining a new baseline pattern of behavior of the purpose-built device in response to the update.

In some examples, determining that the behavior may be the abnormal behavior may include observing the purpose-built device sending traffic via a network protocol that may not have been observed in the baseline pattern of behavior for the purpose-built device.

In some examples, determining that the behavior may be the abnormal behavior may include observing the purpose-built device sending traffic to a network destination that may not have been observed in the baseline pattern of behavior for the purpose-built device.

In one embodiment, a system for implementing the above-described method may include (1) an identification module programmed to identify a purpose-built device expected to have a predictable pattern of behavior on a network, (2) a determination module programmed to determine a baseline pattern of behavior of the purpose-built device, (3) a monitoring module programmed to monitor the network to detect a behavior of the purpose-built device, (4) a comparing module programmed to compare the behavior to the baseline pattern of behavior of the purpose-built device in order to determine that the behavior may be an abnormal behavior, and (5) at least one processor configured to execute the identification module, the determination module, the monitoring module and the comparing module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a purpose-built device expected to have a predictable pattern of behavior on a network, (2) determine a baseline pattern of behavior of the purpose-built device, (3) monitor the network to detect a behavior of the purpose-built device and (4) compare the behavior to the baseline pattern of behavior of the purpose-built device in order to determine that the behavior may be an abnormal behavior.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
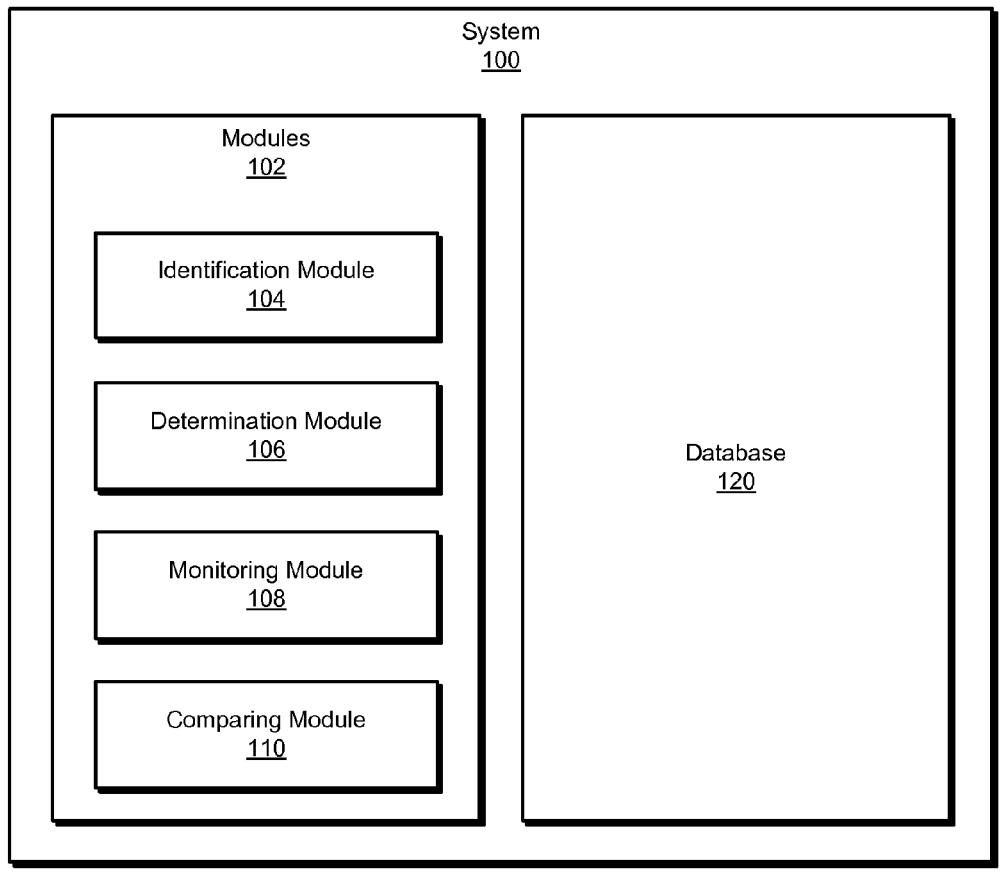
FIG. 1 is a block diagram of an exemplary system for detecting abnormal behavior of networked devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting abnormal behavior of networked devices. As will be explained in greater detail below, by determining the baseline pattern of behavior for a purpose-built device on a network and then monitoring its behavior for deviations from the baseline, the systems and methods described herein can detect behavior that may be caused by malware. Additionally, in some embodiments, by sending behavioral observations to an observation database, the systems and methods described herein may quickly determine baseline patterns of behavior for other devices based on the database without requiring an observation period.

The following will provide, with reference to FIGS. 1, 2, 4, and 5, detailed descriptions of exemplary systems for detecting abnormal behavior of networked devices. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for detecting abnormal behavior of networked devices. As illustrated in this figure, exemplary system 100 may include one or more modules 102 for performing one or more tasks. For example, and as will be explained in greater detail below, exemplary system 100 may also include an identification module 104 programmed to identify a purpose-built device expected to have a predictable pattern of behavior on a network. Exemplary system 100 may additionally include a determination module 106 programmed to determine a baseline pattern of behavior of the purpose-built device. Exemplary system 100 may also include a monitoring module 108 programmed to monitor the network to detect a behavior of the purpose-built device. Exemplary system 100 may additionally include a comparing module 110 programmed to compare the behavior to the baseline pattern of behavior of the purpose-built device in order to determine that the behavior may be an abnormal behavior. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or purpose-built device 208), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store baseline patterns of behavior for purpose-built devices.

Database 120 may represent portions of a single database or computing device or a plurality of databases or computing devices. For example, database 120 may represent a portion of server 520 in FIG. 5, computing system 610 in FIG. 6, and/or portions of exemplary network architecture 700 in FIG. 7. Alternatively, database 120 in FIG. 1 may represent one or more physically separate devices capable of being accessed by a computing device, such as server 520 in FIG. 5, computing system 610 in FIG. 6, and/or portions of exemplary network architecture 700 in FIG. 7.

Figure 2:
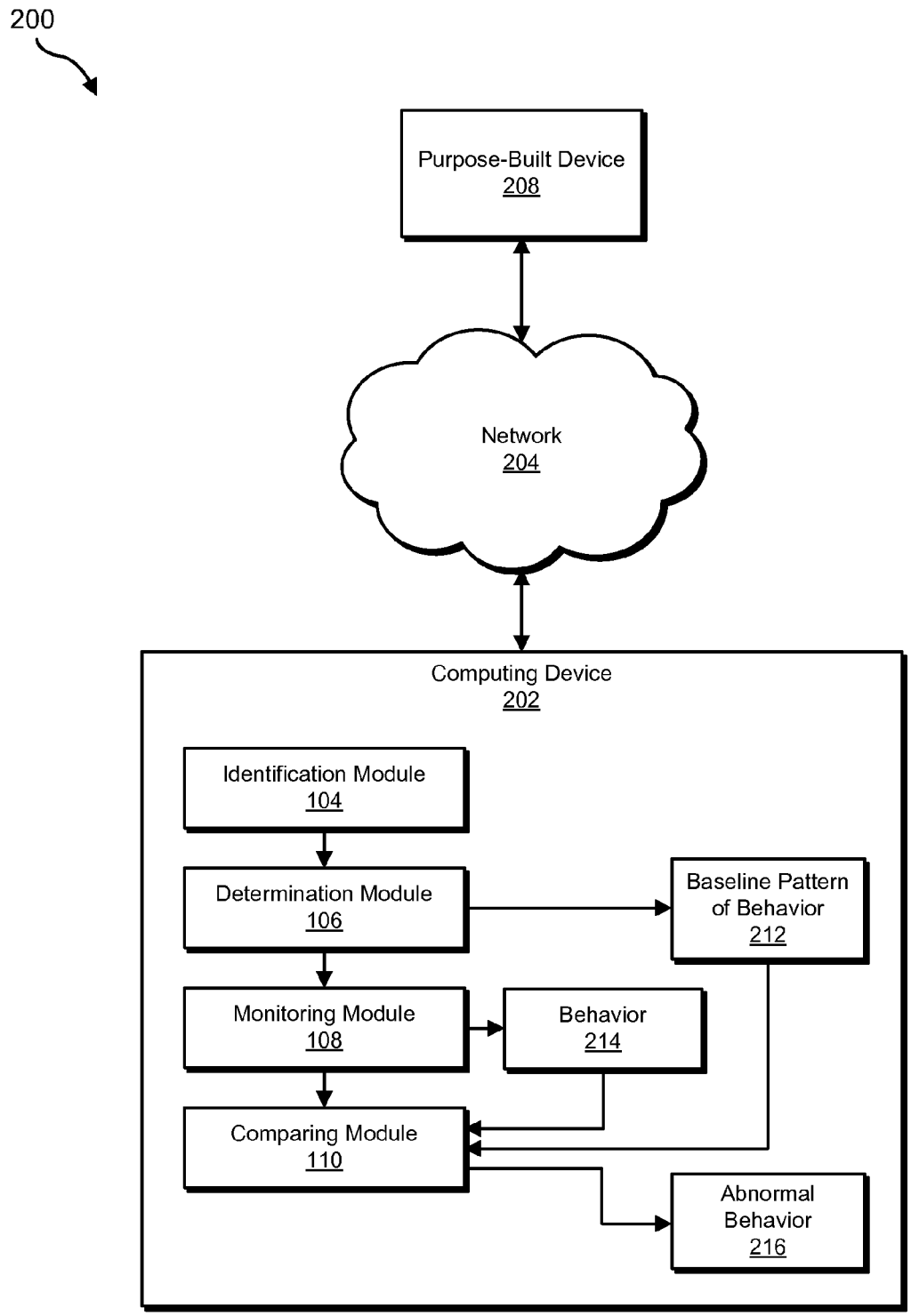
FIG. 2 is a block diagram of an exemplary system for detecting abnormal behavior of networked devices.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a purpose-built device 208 via a network 204. Computing device 202 may be programmed with one or more of modules 102 and/or may store all or a portion of the data in database 120.

In one embodiment, one or more of modules 102 from FIG. 1 may, when executed by at least one processor of computing device 202, facilitate computing device 202 in detecting abnormal behavior of networked devices. For example, and as will be described in greater detail below, one or more of modules 102 may cause computing device 202 to detect abnormal behavior of networked devices. For example, and as will be described in greater detail below, identification module 104 may be programmed to identify purpose-built device 208 expected to have a predictable pattern of behavior on network 204. Determination 106 module may be programmed to determine baseline pattern of behavior 212 of purpose-built device 208. Monitoring module 108 may be programmed to monitor network 204 to detect behavior 214 of purpose-built device 208. Comparing module 110 may be programmed to compare behavior 214 to baseline pattern of behavior 212 of purpose-built device 208 in order to determine that the behavior may be abnormal behavior 216.

Computing device 202 generally represents any type or form of computing device capable of reading computer-executable instructions. Examples of computing device 202 include, without limitation, routers, gateways, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and purpose-built device 208. For example, network 204 may represent a home network.

Figure 3:
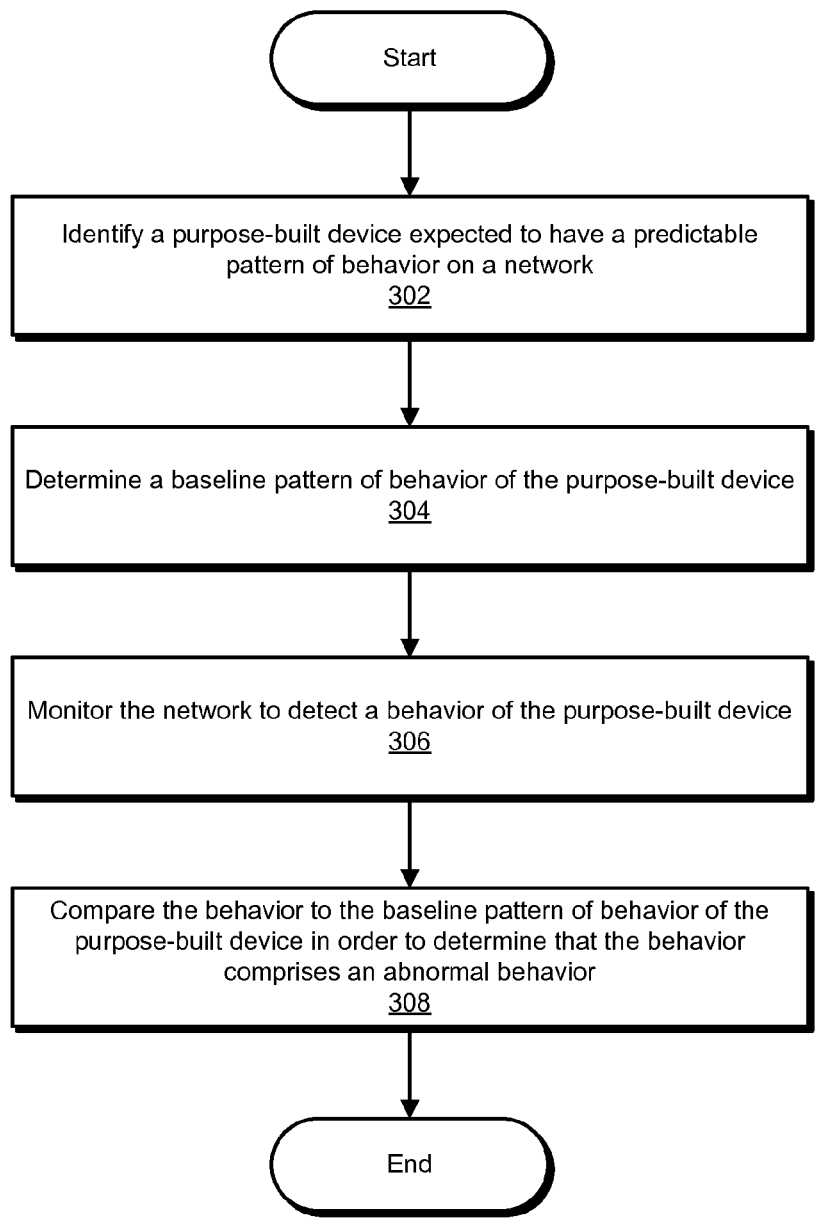
FIG. 3 is a flow diagram of an exemplary method for detecting abnormal behavior of networked devices.

FIG. 3 is a flow diagram of an exemplary computer-implemented method 300 for detecting abnormal behavior of networked devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a purpose-built device expected to have a predictable pattern of behavior on a network. For example, at step 302 identification module 104 may, as part of computing device 202 in FIG. 2, identify purpose-built device 208 expected to have a predictable pattern of behavior on network 204.

The phrase "purpose-built device" as used herein generally refers to any type of networked device expected to have behavior that falls within predictable parameters. For example, the phrase "purpose-built device" may refer to a device configured for a single mode of operation (e.g., as opposed to a general-purpose computing device), a special purpose computer, a device without provision for the post-manufacture installation of applications, etc. The term "behavior" as used herein generally refers to any actions and/or pattern of actions performed by a computing device. In some examples, the term "behavior" may refer to behavior that is observable on a network. Examples of behavior may include, without limitation, target network addresses in communications and/or network protocols used. Features that define a behavior may include, without limitation, time, frequency, destination protocol, IP, hostname, port, and/or approximate size of request and/or response. The phrase "predictable behavior" as used herein generally refers to behavior that may fall within a defined and/or definable subset of all possible behaviors. In some examples, the predictable behavior may refer to a predefined subset of behaviors. In some examples, the predictable behavior may refer to a subset of behaviors not yet known. For example, a purpose-built networked thermostat may exclusively send requests of around 2 kb in size via HTTP to specific websites associated with weather forecasts, and to a central home controller. Some examples of purpose-built devices may include thermostats, toasters, sprinklers, alarm systems, multimedia systems, light fixtures, refrigerators, freezers, ovens, microwaves, printers, and/or clocks.

In some examples, identification module 104 may identify the purpose-built device immediately upon the addition of the purpose-built device to the network. Additionally or alternatively, identification module 104 may identify the purpose-built device during a scan of the network for purpose-built devices. Identification module 104 may identify the purpose-built device by receiving information from the purpose-built device, by making inferences about the purpose-built device (e.g., based on probing the purpose-built device and/or based on observed behaviors of the purpose-built device), and/or by receiving information about the purpose-built device from an external source.

At step 304 one or more of the systems described herein may determine a baseline pattern of behavior of the purpose-built device. For example, at step 304 determination module 106 may, as part of computing device 202 in FIG. 2, determine baseline pattern of behavior 212 of purpose-built device 208.

The phrase "baseline pattern of behavior," when used herein, generally refers to a purpose-built device's observed and/or expected behavior when unaffected by malware. For example, the baseline pattern of behavior for a lawn sprinkler may be to make requests of a weather forecasting service at 6 a.m. every day and make requests of an outdoor thermostat every two hours from 6 a.m. until 8 p.m.

In some examples, determination module 106 may determine the baseline pattern of behavior of the purpose-built device by monitoring the behavior of the purpose-built device for a predetermined period of time to establish by observation the baseline behavior of the purpose-built device. In some examples the predetermined period of time may include one day, one week, two weeks, and/or one month. For example, determination module 106 may observe one or more communication protocols used by the purpose-built device during the predetermined period of time and/or one or more network locations in communication with the purpose-built device during the predetermined period of time.

In some embodiments, determination module 106 determining the baseline pattern of behavior of the purpose-built device may include determining a type of the purpose-built device and querying an observation database populated with at least one observation of baseline behavior of at least one of a plurality of purpose-built devices of the type. In some examples, the type may indicate a make and model of the purpose-built device. In some examples, determining the type may include using a network mapping tool such as NMAP and/or discovery protocols such as Bonjour and/or UPnP. In some examples, the type may be determined by isolating the vendor ID portion of the purpose-built device's MAC address.

In some embodiments, determination module 106 determining the baseline pattern of behavior of the purpose-built device may include using pre-populated data about the expected pattern of behavior of the purpose-built device. For example, determination module 106 may query a database with an identifier of the purpose-built device that includes manufacturer-defined behaviors.

In some embodiments, determination module 106 determining the baseline pattern of behavior of the purpose-built device may include querying an observation database with at least one behavioral observation about the purpose-built device and receiving a response correlating the behavioral observation about the purpose-built device with the baseline pattern of behavior of the purpose-built device. For example, determination module 106 may query an observation database built from observations of identical and/or similar devices installed in other locations (e.g., other households and/or offices). Examples of a behavioral observation may include "this device only sends an HTTP requests to a specific website," "this device sends HTTP requests at exactly 7 pm every weekday," "this device receives data from a specific website on the second Tuesday of the month," "this device sends HTTP requests to three specific websites," "this device receives .mp3 files via FTP," and/or "this device communicates with another device on the LAN."

Returning to FIG. 3, at step 306 one or more of the systems described herein may monitor the network to detect a behavior of the purpose-built device. For example, at step 306 monitoring module 108 may, as part of computing device 202 in FIG. 2, monitor network 204 to detect behavior 214 of purpose-built device 208. In some examples, behavior 214 may include sending an HTTP request and/or transferring a file via FTP.

In some embodiments, monitoring module 108 may be configured to intercept all requests passing through the gateway. In some examples, monitoring module 108 may intercept a request and may determine that the request originated from the purpose-built device and therefore may qualify as a behavior of the purpose-built device.

At step 308 one or more of the systems described herein may compare the behavior to the baseline pattern of behavior of the purpose-built device in order to determine that the behavior may be an abnormal behavior. For example, at step 308 comparing module 110 may, as part of computing device 202 in FIG. 2, compare the behavior 214 to baseline pattern of behavior 212 of purpose-built device 208 in order to determine that the behavior 214 may be abnormal behavior 216.

In some examples, determination module 106 determining that the behavior may be the abnormal behavior may include observing the purpose-built device sending traffic via a network protocol that is not observed in the baseline pattern of behavior of the purpose-built device. For example, a request via FTP from a sprinkler that was observed to make only HTTP requests in its baseline pattern of behavior may be an abnormal behavior.

In some examples, determination module 106 determining that the behavior may be the abnormal behavior may include observing the purpose-built device sending traffic to a network destination that may not have been observed in the baseline pattern of behavior for the purpose-built device. For example, if a toaster was observed to only communicate with the manufacturer's website as its baseline pattern of behavior, determination module 106 may determine that the toaster subsequently sending an HTTP request to a gambling website represents an abnormal behavior.

Figure 4:
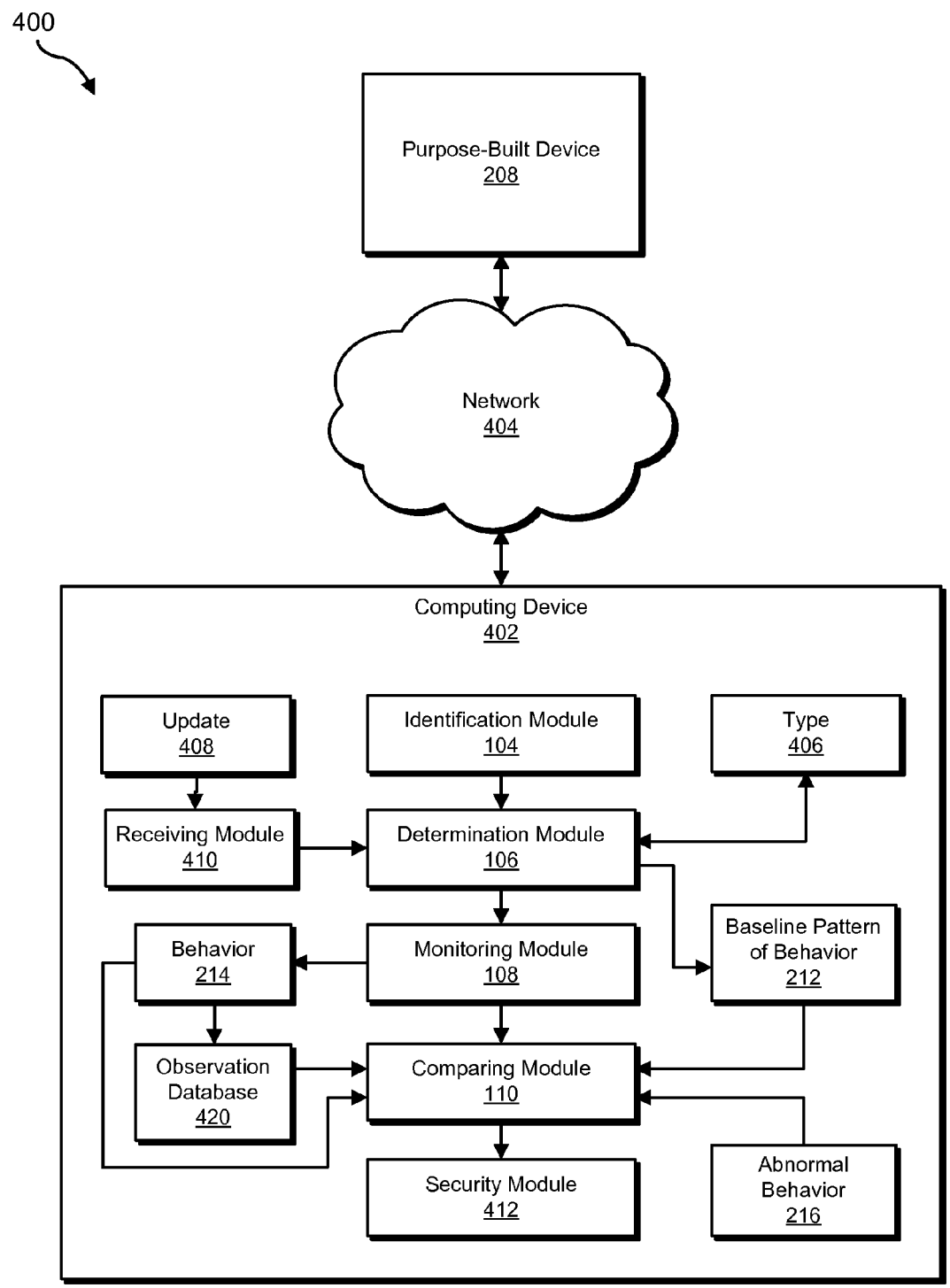
FIG. 4 is a block diagram of an exemplary system for detecting abnormal behavior of networked devices.

FIG. 4 illustrates an exemplary system 400 for detecting abnormal behavior of networked devices. As illustrated in FIG. 4, exemplary system 400 may include a computing device 402 in communication with a purpose-built device 208 via a network 404. For example, computing device 406 may communicate with purpose-built device 208 to detect abnormal behavior of purpose-built device 208. In some examples, computing device 406 may be configured with modules 102, including identification module 104. In some embodiments, computing device 402 may contain determination module 106, monitoring module 108, comparing module 110, security module 412 and receiving module 410.

As illustrated in FIG. 4, in some embodiments receiving module 410 may receive information about update 408 to purpose-built device 208 and determination module 106 may determine a new baseline pattern of behavior of the purpose-built device in response to update 408. Some examples of update 408 may include firmware upgrades to the purpose-built device, clock updates that adjust for the start or end of daylight savings time, and/or data updates such as new IP addresses. In some examples, receiving an update may cause one or more of the systems described herein to determine a new baseline pattern of behavior.

As illustrated in FIG. 4, in some embodiments security module 412 may perform a security action in response to determining that behavior 214 of purpose-built device 208 includes abnormal behavior 216. In some examples the security action may include blocking the purpose-built device from the network, filtering out the abnormal behavior of the purpose-built device on the network, and/or alerting a user to the abnormal behavior of the purpose-built device. For example, security module 412 may filter out the abnormal behavior by blocking communications from and/or to the purpose-built device that use unexpected protocols and/or that include unexpected network locations.

In some embodiments, determination module 106 may determine a type 406 of the device. For example, the determination module may use a network mapping tool such as NMAP in order to determine that the device is a toaster. The determination module may also use the type, in combination with other information, in order to make a determination about the device. For example, the determination module may determine that a toaster which makes HTTP requests to known malware sites may be performing an abnormal behavior and therefore may be a malicious toaster.

In some embodiments, monitoring module 108 may send behavior 214 to observation database 420. The observation database may include baseline patterns of behavior of various types of devices, known malicious behaviors, and/or behavioral observations for unknown devices.

Figure 5:
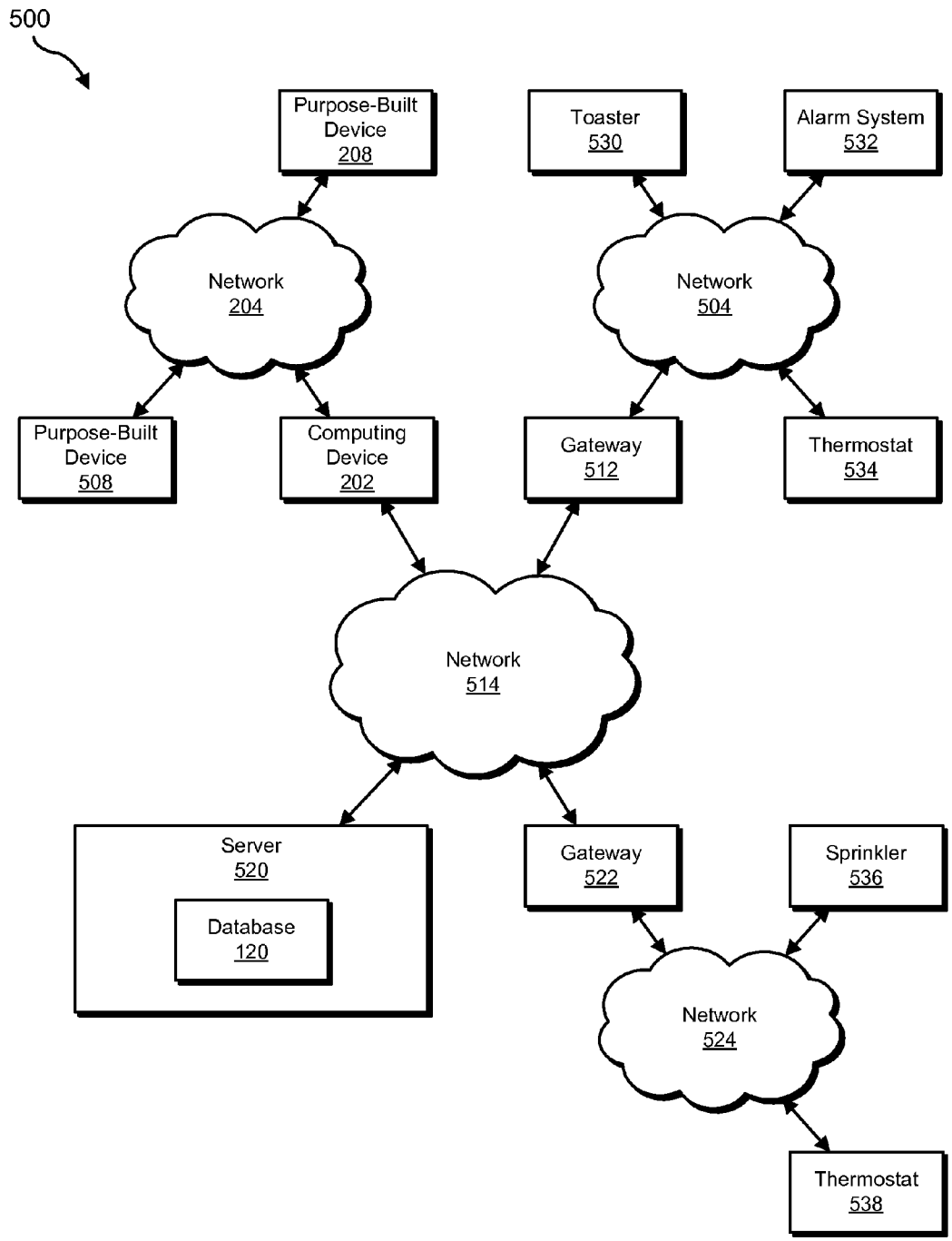
FIG. 5 is a block diagram of an exemplary system for detecting abnormal behavior of networked devices.

FIG. 5 illustrates an exemplary system 500 for detecting abnormal behavior of networked devices. As illustrated in FIG. 5, exemplary system 500 may include computing device 202, gateway 512 and/or gateway 522 in communication with server 520 via a network 514. Exemplary system 500 may also include purpose-built device 208 and/or purpose-built device 508 in communication with computing device 202 via network 204. Exemplary system 500 may additionally include toaster 530, alarm system 532 and/or thermostat 534 in communication with gateway 512 via network 504. Exemplary system 500 may also include sprinkler 536 and/or thermostat 538 in communication with gateway 522 via network 524.

In some embodiments, exemplary system 500 may use behavioral observations from thermostat 534 in order to determine a baseline pattern of behavior of thermostat 538. For example, thermostat 534 may have the identifying information of "model X from company Y" and may be observed to have the behavior of exclusively making HTTP requests to company Y's website. Gateway 512 may send that information to database 120 on server 520. Gateway 522 may query database 120 in order to determine the baseline pattern of behavior for thermostat 538, and may supply the information that thermostat 538 has the identifying information of "model X from company Y." In this example, server 520 may respond that the baseline pattern of behavior for thermostat 538 may be to exclusively make HTTP requests to company Y's website.

Server 520 generally represents any type or form of computing device that is capable of storing data about behavioral observations. Examples of server 520 include, without limitation, application servers and database servers configured to provide various database services and/or run certain software applications.

As explained above in connection with method 300 in FIG. 3, a gateway may identify a purpose-built device expected to have a predictable pattern of behavior on a network. The gateway may establish a baseline pattern of behavior for the purpose-built device, which may include observing the purpose-built device for a predefined time period and/or querying an observation database about the purpose-built device.

The gateway may monitor the network to detect behaviors of the purpose-built device. When a behavior is detected, the gateway may query an observation database about the behavior in order to determine whether it is part of the baseline pattern of behavior for the purpose-built device or whether it is an abnormal behavior. If the behavior may be an abnormal behavior the gateway may perform a security action, which may include filtering the abnormal behavior, blocking the purpose-built device from the network, and/or alerting a user to the abnormal behavior.

Figure 6:
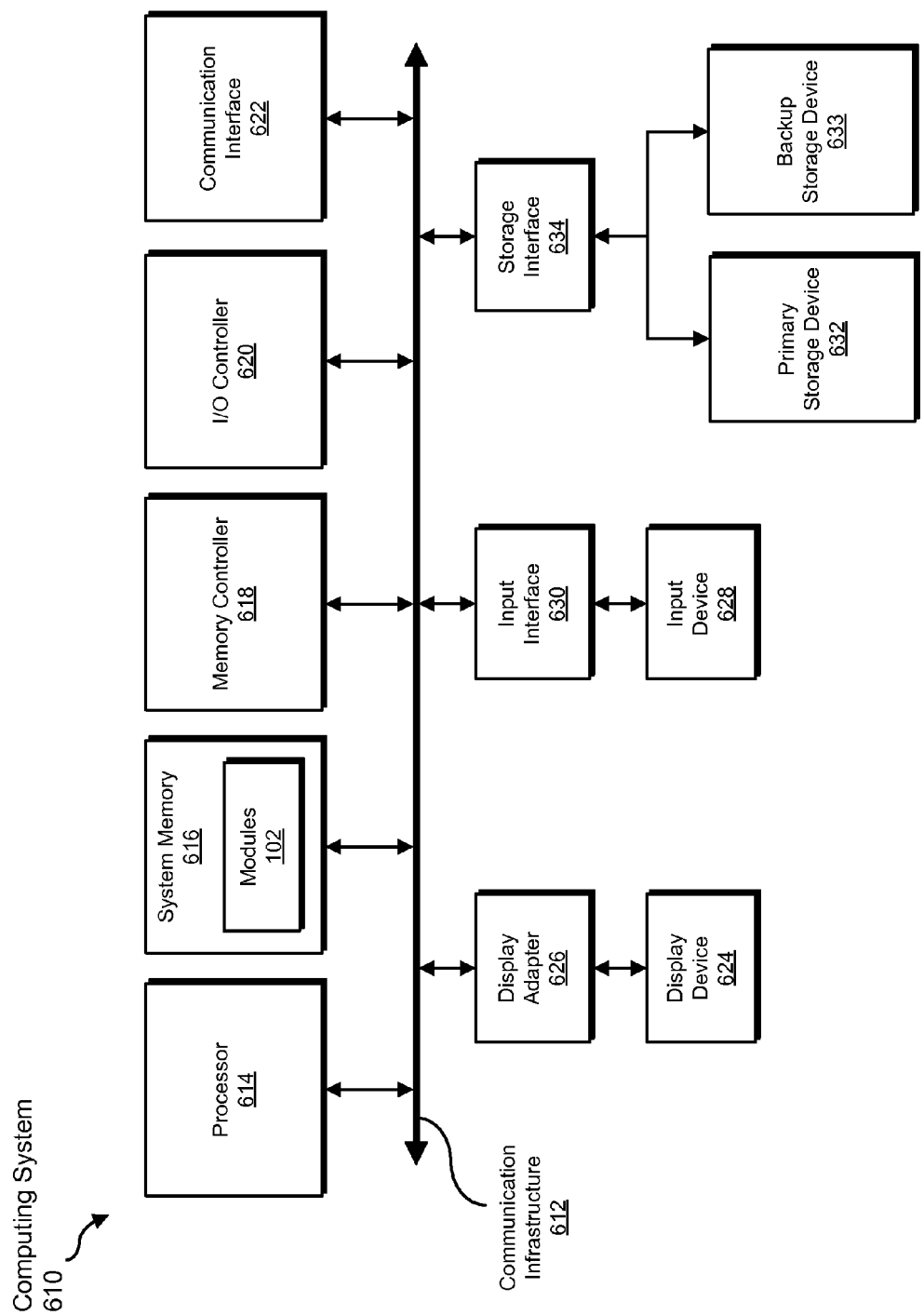
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, monitoring, determining, comparing, performing, blocking, filtering, alerting, querying, sending and/or observing steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
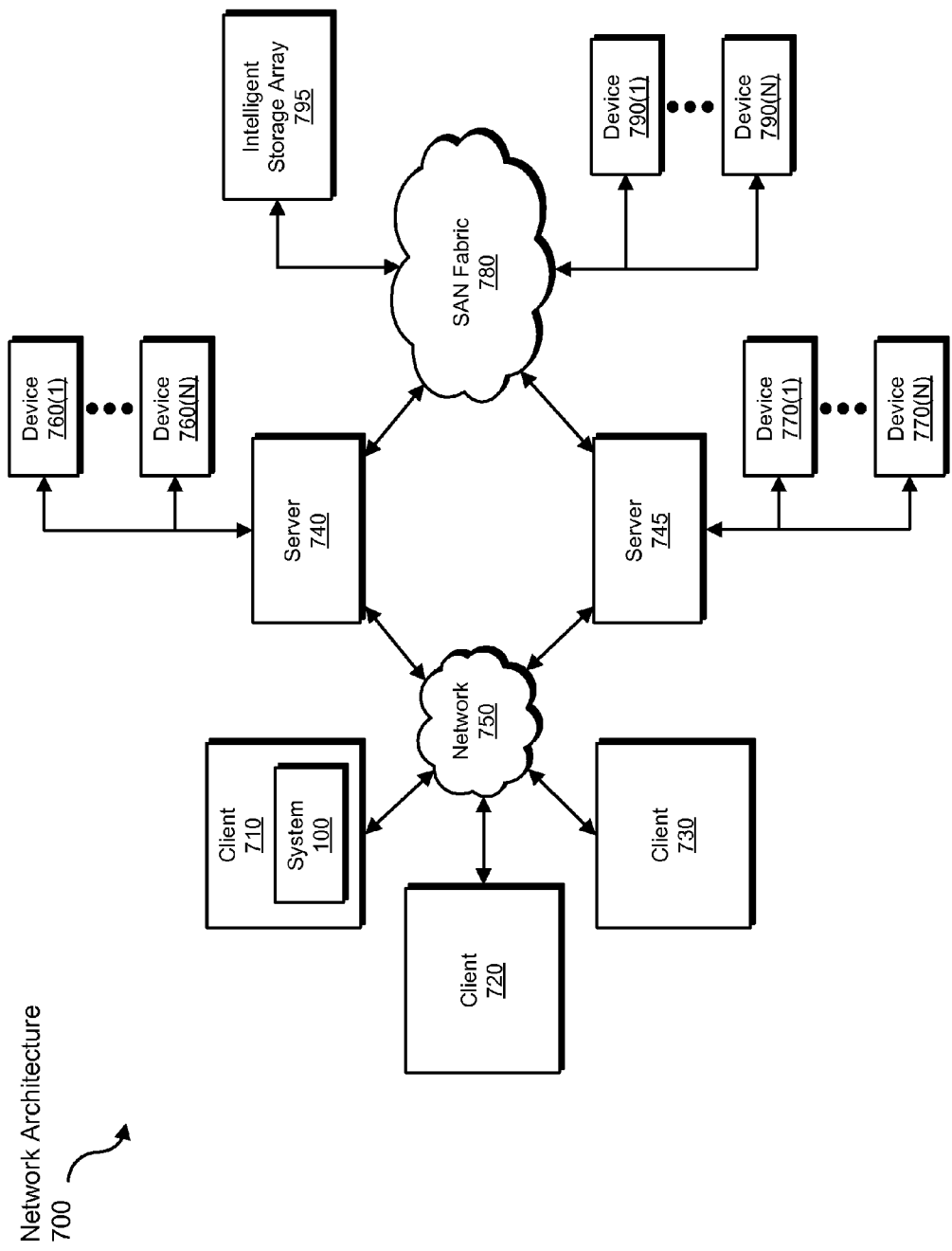
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, monitoring, determining, comparing, performing, blocking, filtering, alerting, querying, sending and/or observing steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting abnormal behavior of networked devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive behavioral observations to be transformed, transform the behavioral observations, output a result of the transformation to a comparison module, use the result of the transformation to make judgments about behavior, and store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting abnormal behavior of networked devices, at least a portion of the method being performed by a computing device comprising at least one processor, the method comprising:
   identifying a purpose-built device expected to have a predictable pattern of behavior on a network;
   determining a baseline pattern of behavior of the purpose-built device, wherein determining the baseline pattern of behavior of the purpose-built device comprises determining a type of the purpose-built device and, based on the type of the purpose-built device, querying an observation database populated with at least one observation of baseline behavior of at least one of a plurality of purpose-built devices of the type;
   monitoring the network to detect a behavior of the purpose-built device;
   comparing the behavior to the baseline pattern of behavior of the purpose-built device in order to determine that the behavior comprises an abnormal behavior.

2. The computer-implemented method of claim 1, further comprising performing a security action in response to determining that the behavior of the purpose-built device is abnormal.

3. The computer-implemented method of claim 2, wherein the security action comprises at least one of:
   blocking the purpose-built device from the network;
   filtering out the abnormal behavior of the purpose-built device on the network;
   alerting a user to the abnormal behavior of the purpose-built device.

4. The computer-implemented method of claim 1, wherein determining the baseline pattern of behavior of the purpose-built device comprises monitoring the purpose-built device for a predetermined period of time to establish by observation the baseline behavior of the purpose-built device.

5. The computer-implemented method of claim 1, wherein the type indicates a make and model of the purpose-built device.

6. The computer-implemented method of claim 1, wherein determining the baseline pattern of behavior of the purpose-built device comprises querying the observation database with at least one behavioral observation about the purpose-built device and receiving a response correlating the behavioral observation about the purpose-built device with the baseline pattern of behavior of the purpose-built device.

7. The computer-implemented method of claim 1, further comprising sending a behavioral observation about the purpose-built device and an identifier of the purpose-built device to the observation database.

8. The computer-implemented method of claim 1, further comprising receiving information about an update to the purpose-built device and determining a new baseline pattern of behavior of the purpose-built device in response to the update.

9. The computer-implemented method of claim 1, wherein determining that the behavior comprises the abnormal behavior comprises observing the purpose-built device sending traffic via a network protocol that is not observed in the baseline pattern of behavior for the purpose-built device.

10. The computer-implemented method of claim 1, wherein determining that the behavior comprises the abnormal behavior comprises observing the purpose-built device sending traffic to a network destination that is not observed in the baseline pattern of behavior for the purpose-built device.

11. A system for detecting abnormal behavior of networked devices:
   the system comprising:
   an identification module programmed to identify a purpose-built device expected to have a predictable pattern of behavior on a network;
   a determination module programmed to determine a baseline pattern of behavior of the purpose-built device, wherein determining the baseline pattern of behavior of the purpose-built device comprises determining a type of the purpose-built device and, based on the type of the purpose-built device, querying an observation database populated with at least one observation of baseline behavior of at least one of a plurality of purpose-built devices of the type;
   a monitoring module programmed to monitor the network to detect a behavior of the purpose-built device;
   a comparing module programmed to compare the behavior to the baseline pattern of behavior of the purpose-built device in order to determine that the behavior comprises an abnormal behavior;
   at least one processor coupled to a memory and configured to execute the identification module, the determination module, the monitoring module and the comparing module.

12. The system of claim 11, further comprising a security module programmed to perform a security action in response to determining that the behavior of the purpose-built device is abnormal.

13. The system of claim 12, wherein the security action comprises at least one of:
   blocking the purpose-built device from the network;
   filtering out the abnormal behavior of the purpose-built device on the network;
   alerting a user to the abnormal behavior of the purpose-built device.

14. The system of claim 11, wherein the determination module is programmed to determine the baseline pattern of behavior of the purpose-built device by monitoring the purpose-built device for a predetermined period of time to establish by observation the baseline behavior of the purpose-built device.

15. The system of claim 11, wherein the determination module is programmed to determine the baseline pattern of behavior of the purpose-built device by querying the observation database with at least one behavioral observation about the purpose-built device and receiving a response correlating the behavioral observation about the purpose-built device with the baseline pattern of behavior of the purpose-built device.

16. The system of claim 11, further comprising a sending module programmed to send a behavioral observation about the purpose-built device and an identifier of the purpose-built device to the observation database.

17. The system of claim 11, further comprising a receiving module programmed to receive information about an update to the purpose-built device and determining a new baseline pattern of behavior of the purpose-built device in response to the update.

18. The system of claim 11, wherein the type indicates a make and model of the purpose-built device.

19. A non-transitory computer-readable-storage medium comprising one or more computer-readable instructions that, when executed by at least one processor of a computing device, cause the computing device to:
- identify a purpose-built device expected to have a predictable pattern of behavior on a network;
- determine a baseline pattern of behavior of the purpose-built device, wherein determining the baseline pattern of behavior of the purpose-built device comprises determining a type of the purpose-built device and, based on the type of the purpose-built device, querying an observation database populated with at least one observation of baseline behavior of at least one of a plurality of purpose-built devices of the type;
- monitor the network to detect a behavior of the purpose-built device;
- compare the behavior to the baseline pattern of behavior of the purpose-built device in order to determine that the behavior comprises an abnormal behavior.

20. The computer-readable-storage medium of claim 19, wherein the type indicates a make and model of the purpose-built device.

\* \* \* \* \*